United States Patent [19]

Collin

[11] 4,416,689
[45] Nov. 22, 1983

[54] PROCESS FOR THE MANUFACTURE OF CRUDE IRON AND ENERGY-RICH GASES

[75] Inventor: Per H. Collin, Stocksund, Sweden

[73] Assignee: Asea AB, Västerås, Sweden

[21] Appl. No.: 311,007

[22] Filed: Oct. 13, 1981

[30] Foreign Application Priority Data

Oct. 15, 1980 [SE] Sweden .............................. 8007225

[51] Int. Cl.³ .............................................. C21C 5/52
[52] U.S. Cl. .......................................... 75/11; 75/34; 75/60; 266/155; 266/156
[58] Field of Search ............... 75/11, 34, 60; 266/155, 266/156

[56] References Cited

U.S. PATENT DOCUMENTS

| | | | |
|---|---|---|---|
| 3,224,871 | 12/1965 | Collin | 75/34 |
| 3,834,895 | 9/1974 | Cachat | 75/11 |
| 4,218,241 | 8/1980 | Hegemann | 75/60 |

*Primary Examiner*—Peter D. Rosenberg
*Attorney, Agent, or Firm*—Fred A. Keire

[57] ABSTRACT

A process for preparing crude iron and energy-rich, gases, the raw materials being comprised of iron ore concentrate, carbon-containing materials, optionally oxygen gas and electric energy, comprising the combination of the following operations:

1.1: preheating of the iron ore concentrate by means of combustion gases from the combustion of discharged gases from the prereduction according to 1.2 below;

1.2: prereduction of the iron oxides of the concentrate preheated according to 1.1 by means of part of the discharged gases from the arc furnace according to 1.3 below;

1.3: introduction of the concentrate prereduced according to 1.2 into the plasma zone below the electrode of an arc furnace, which contains a crude iron melt, the temperature of which is maintained above 1300° C. by means of adjusted supply of electric energy to the arc, and the content of dissolved carbon of which is maintained at a suitable value by injection of carbon-containing materials into the crude iron phase at a depth below its surface of at least about 20 cm;

1.4: precooling of the gases discharged from the arc by feeding directly into the gas stream an adjusted flow of cooling agent;

1.5: recovering an essential part of the physical heat content of the gases precooled according to 1.4 by heat exchange; and 1.6: utilization of the energy-rich gases heat exchanged according to 1.5 for prereduction according to 1.2 and for an external need as a fuel and or a raw material for syntheses.

4 Claims, 1 Drawing Figure

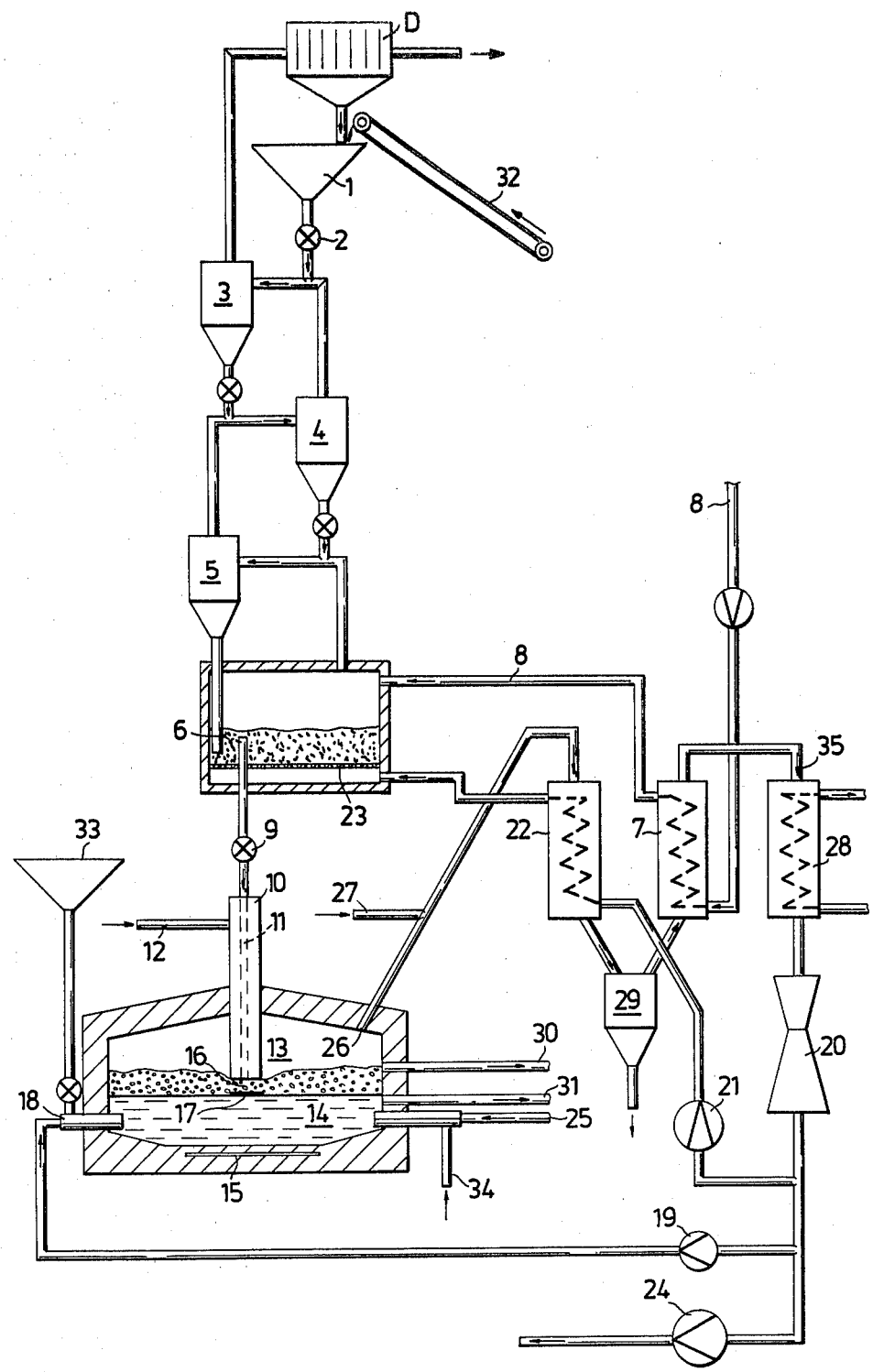

PROCESS FOR THE MANUFACTURE OF CRUDE IRON AND ENERGY-RICH GASES

The present invention relates to a process for preparing crude iron and energy-rich gases suitable as fuel and/or as starting materials for syntheses. The raw materials consist of iron ore concentrate, carbon-containing materials, such as peat, low and high bituminous coal, char etc., optionally oxygen gas and electric energy. At sites with good access to cheap coal and/or cheap electric energy the process results in significant economic advantages due to high product value, low production costs and low capital costs.

According to the invention, which is defined in the appended patent claims, fine-grained iron ore concentrate, suitably preheated and prereduced in admixture with adjusted proportions of fine-grained slag formers (for example $CaCO_3$, $CaO$, $SiO_2$ etc.) is introduced into the plasma zone between the electrode and a crude iron melt in an arc furnace, preferably supplied with direct current, the temperature of the crude iron melt being maintained by means of adjusted supply of electric energy, above 1300° C., suitably between 1350° and 1500°, and the fine-pulverized carbon-containing materials and optionally oxygen gas being injected into the crude iron at a depth of at least 30 cm below the crude iron surface in an adjusted flow so that the content of dissolved carbon of the melt is maintained at a value suitably exceeding about 2%, preferably between 2.5 and 4%.

In order to further describe the invention there are given below as examples the formulae of the chemical reactions taking place in the arc furnace in reduction of hematite at 1450° using a gas flame coal with 35% volatile substances, the elementary analysis being given below and having an effective heat value of 8110 Kcal/kg, based on a water and ash-free substance:

|   | C | H | O | Rest |
|---|---|---|---|------|
| % | 86.3 | 5.4 | 5.7 | 2.6 |

Since there is an external need for fuel gases corresponding to 1.2 Gcal/t Fe for heating ingots, coils etc., oxygen gas is injected into the melt with an adjusted flow so that fuel gases corresponding to said need can be discharged from the system.

The hematite of the iron ore concentrate is prereduced to wüstite before transfer into the arc furnace. This prereduction is carried out at 900° C. using gases from the arc furnace. The gases are first cooled from 1450° to 900° C. by injection directly into the water gas and propane in adjusted proportions. The physical heat content of the gases is then utilized by heat exchange, and the gases are then freed from dust etc. and reheated by said heat exchange.

Under the above conditions the main reaction on the surface of the melt beneath the plasma zone can be illustrated with the following equation:

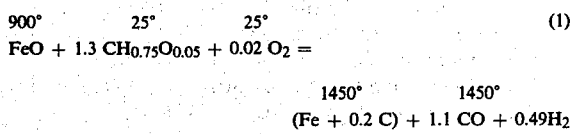

The equation means that the coal injected into the melt cracks under release of its content of hydrogen, whereas the content of carbon dissolves in the crude iron and reacts with the wüstite oxygen, the coal oxygen and injected oxygen to form CO, the residual part of the dissolved carbon ($\underline{C}$) being discharged with the 4% crude iron.

The cooling of the furnace gases from 1450° to 900° C. with water and propane can be illustrated with the following equation:

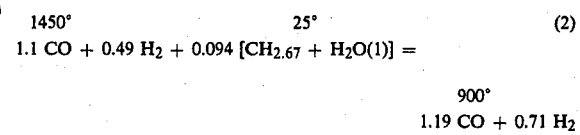

From equations (1) +(2) it is clear that for the cooling there is required 25 kg propane/ton Fe.

In order to cover the external heat requirement of 1.2 Gcal/t Fe 56% of the cooled gases are discharged, whereas the rest is utilized for prereduction, which can be illustrated by the following equation:

$$0.5\ Fe_2O_3 + 0.44\ (1.19\ CO + 0.71\ H_2) = FeO + 0.30\ CO_2 + 0.22\ CO + 0.20\ H_2O + 0.11\ H_2 \quad (3)$$

The prereduction takes place at ~900° in a fluidized bed of classical type, the period of contact between the concentrate and the gases being adjusted so that the gases are usefully at a ratio of $CO_2/CO \sim 1.4$ and $H_2O/H_2 \sim 1.8$, respectively, which means providing of sufficiently large driving force compared to the conditions of equilibrium to ensure rapid reduction.

The hot discharged gases from the prereduction are burnt with air, which suitably is preheated. The heat contents of the combustion gases obtained are utilized for preheating the concentrate before the prereduction.

To prepare 1000 kg of Fe in the form of liquid crude iron and 1.2 Gcal energy-rich gases having the composition 63% CO+37% $H_2$ there is needed in accordance with the above equations 320 kg water- and ash-free coal
 25 kg propane
 8 $Nm^3$ oxygen gas
 1660 kwh electric energy it being assumed that the energy conversion efficiency of the arc furnace is 85%.

In places where electric energy is cheap, for example Northern Norway, Venezuela etc., the above-mentioned consumption numbers enable an economically highly advantageous production of iron in small units.

It is, of course, also possible within the scope of the invention to carry the prereduction further than to FeO. This will increase the consumption of coal and oxygen gas and reduce the consumption of electric energy. If, for example, one wants to carry the prereduction to a degree or reduction of 50%, i.e. to $FeO_{0.75}$, it will, however, be necessary to use two prereduction steps coupled in series if the consumption of carbon shall not become too high. This means that contaminated gases must be transferred from one prereduction step to the other. In practice this results in difficult clogging problems in the gas distributing device of the latter step.

In accordance with the process of the invention the production of energy-rich gases will be totally independent of the crude iron production, which is an advantage. Thus, if in the above example it is desired to divert >1.2 Gcal/t Fe it means an increase of the supply of coal and oxygen but a decrease of the supply of electric energy.

The crude iron produced in the arc furnace will have low contents (<0.1%) of Si as well an Mn due to the conditions in the furnace. This fact makes crude iron prepared in accordance with the invention extremely suited for "slagless refining" which makes the steel manufacture cheaper.

The sulfur content of the crude iron will be dependent on the sulfur content in the injected coal. About half the amount of the sulfur from the coal will be found in the crude iron which thus in several cases must be desulphurized in a separate operation (for example injection of CaO) before the oxygen gas blowing.

To further illustrate the process according to the invention it will be more particularly described in connection with the appended drawing illustrating an embodiment of the invention.

Fine-grained iron ore concentrate admixed in adjusted proportions with limestone or any suitable slag former ($CaCO_3$, $CaO$, $SiO_2$ etc.) and having a grain size of 0–10 mm, suitably 0–6 mm and preferably 0–3 mm is fed via a conveyor 32 and from a silo 1 by means of a feeder 2 in a constant flow to preheating cyclones 3, 4 and 5. Said cyclones are coupled in cascade and designed in the same way as the preheating cyclones of a modern cement furnace (see for example Ullman, Encyklopädie der Technischen Chemie 3. Edition 19 vol. p 17, illustration 8). In the cyclones the mixture meets hot gases obtained by combustion of the gases from a prereduction bed 6 with air from a conduit 8 and preheated in a gas exchanger 7. The exhaust gases from cyclone 3 are purified in a dust filter D and released, whereas separated dust is returned to silo 1.

The preheated materials from cyclone 5 are introduced in the prereduction bed 6 wherein they are prereduced to the desired degree by means of purified preheated gases from the furnace. The purified gases are transferred via a compressor 21 and a heat exchanger 22 beneath a gas distributor 23 in the fluidized prereduction bed 6.

From the prereduction bed 6 which is under a moderate over-pressure the prereduced materials are metered by water 9 from the bed and transferred to the centrally positioned channel 10 of the electrode 11 of an arc furnace 13 supplied with direct current 12. Electrode 11 is coupled as a cathode whereas the crude iron melt constitutes anode through one or several bottom electrodes 15.

Through channel 10 and plasma zone 16 beneath the electrode, the hot prereduced materials fall down onto the surface of the crude iron melt 14 in the hot spot 17 created by the arc. Here the contents of the materials of iron oxide are reduced to Fe by carbon dissolved in the melt, an equivalent quantity of CO being released. The iron melts under carburization to crude iron and the carbon content of the melt is maintained at suitably at least about 2% C, preferably 2.5–4%, by injection into the melt of the fine-grained carbon-containing material.

The injection of carbon-containing material, e.g. coal, suitably takes place in a manner known per se (see for example Stahl u. Eisen, May 1980, p. 543) through a hopper 33 and one or several nozzles 18 at a depth of at least about 20 cm, preferably at least about 30 cm, beneath the crude iron surface. As a transport gas for the fine-grained (medium particle size suitably <0.5 mm) carbon-containing material there may be used with advantage in a compression 19 compressed purified (20) gases from the arc furnace 13. Crude iron and slag are discharged from the furnace 13 via lines 30 and 31, respectively, in a manner known per se.

The required oxygen gas (in view of the external need for energy-rich gas 24) is injected into the crude iron melt through a conduit 25 together with propane via a tube 34, in a manner known per se (see for example the above-mentioned p. 543 of Stahl u. Eisen).

The hydrogen gas formed in cracking the carbon-containing material in the crude iron melt will admix with CO formed in the reduction and the partial combustion of carbon dissolved in the melt. The gas mixture having a temperature of 1300°–1500° is discharged from the furnace 13 via a tube 26 and precooled to ~900° C., suitably by introduction a coolant through a line 27 directly into the gas flow, the coolant preferably consists of water and/or water vapour and light hydrocarbons, for example propane. The cooling takes place by reaction of water and hydrocarbon form CO and $H_2$ binding considerable quantities of energy. The flows of water and hydrocarbon are suitably adjusted so that the gas temperature when entering the heat exchanger 22 is 900°–1000° C. At this final temperature practically all hydrocarbon has been reacted.

Through heat exchange against fluidizing gases 22, air 7 and for example boiling water fed via a conduit 35 to a heat exchanger 28 the gases are further cooled, the precipitating dust being separated (in a dust separator 29) and returned to the silo 1. The gases are then finally cooled and purified by scrubbing with water in one or several venturi scrubbers 20. The washings leaving the scrubbers contain soot difficult to separate. By treatment with naphtha the soot can be transferred to the naphtha phase from which the soot can be easily separated. The soot is recovered by being admixed with the carbon-containing material for feeding into arc furnace 13.

I claim:

1. A process for preparing crude iron and energy-rich gases, the raw materials being comprised of iron ore concentrate and carbon-containing materials, and further oxygen gas and whereby electric energy is also supplied, comprising:

1.1: preheating an iron ore concentrate, or an iron ore concentrate in admixture with adjusted proportions of slag formers, by means of combustion gases from a combination of discharged gases from a prereduction according to 1.2 below;

1.2: prereducing iron oxides, in the concentrate preheated according to 1.1, by means of a part of discharged gases obtained from an arc furnace according to 1.3 below;

1.3: introducing a concentrate prereduced according to 1.2 into plasma zone below an electrode forming an arc in an arc furnace, and which furnace contains a crude iron melt, the temperature of said melt being maintained above 1300° C. by means of an adjusted supply of electric energy to said arc, and maintaining a dissolved carbon content in said crude iron melt at least about 2% of C and higher, by injection of carbon-containing materials into the crude iron melt below its surface;

1.4: precooling of gases discharged from the arc furnace by feeding directly into the gas stream an adjusted flow of a cooling agent consisting of water, steam, light hydrocarbons, or mixtures thereof;

1.5: recovering by heat exchange a part of the physical heat content of the gases precooled according to 1.4, said heat exchange being also with gases for the prereduction according to 1.2, air for the preheating according to 1.1, or water for the generation of steam or hot water;

1.6: recycling, for prereduction, the energy-rich gases heat exchanged according to 1.5, or recycling for prereduction said energy-rich gases after freeing these from dust, said prereduction being according to 1.2.

2. The process as defined in claim 1, wherein said energy-rich gases in 1.6 are diverted as a fuel or as a synthesis gas.

3. The process as defined in claim 1, wherein in 1.3 said electrode is forming an arc of a direct current.

4. The process as defined in claim 1, wherein in 1.3 the carbon content is maintained by injection of said carbon-containing material in said iron melt at a depth of at least about 20 cm below the surface of said melt.

* * * * *